United States Patent
Liu et al.

(10) Patent No.: US 10,101,461 B2
(45) Date of Patent: Oct. 16, 2018

(54) RADIO FREQUENCY CIRCUIT STRUCTURE FOR IMPLEMENTING FUNCTION OF CONVERTING GNSS SATELLITE SIGNAL INTO BASEBAND SIGNAL

(71) Applicant: COMNAV TECHNOLOGY LTD., Shanghai (CN)

(72) Inventors: Jie Liu, Shanghai (CN); Yongquan Wang, Shanghai (CN); Yang Song, Shanghai (CN)

(73) Assignee: COMNAV TECHNOLOGY LTD., Shanghai (CN)

( * ) Notice: Subject to any disclaimer, the term of this patent is extended or adjusted under 35 U.S.C. 154(b) by 283 days.

(21) Appl. No.: 14/912,040

(22) PCT Filed: Aug. 29, 2013

(86) PCT No.: PCT/CN2013/082599
§ 371 (c)(1),
(2) Date: Feb. 12, 2016

(87) PCT Pub. No.: WO2015/021673
PCT Pub. Date: Feb. 19, 2015

(65) Prior Publication Data
US 2016/0195620 A1 Jul. 7, 2016

(30) Foreign Application Priority Data
Aug. 15, 2013 (CN) .......................... 2013 1 0357619

(51) Int. Cl.
*G01S 19/32* (2010.01)
*G01S 19/36* (2010.01)
(Continued)

(52) U.S. Cl.
CPC .............. *G01S 19/36* (2013.01); *G01S 19/33* (2013.01); *G01S 19/32* (2013.01); *G01S 19/35* (2013.01); *G01S 19/37* (2013.01)

(58) Field of Classification Search
CPC .......... G01S 19/36; G01S 19/32; G01S 19/33; G01S 19/35; G01S 19/37
(Continued)

(56) References Cited

U.S. PATENT DOCUMENTS

| 5,923,287 A * | 7/1999 | Lennen | G01S 19/36 342/357.73 |
| 8,120,531 B2 * | 2/2012 | Yang | G01S 19/36 342/357.76 |

(Continued)

FOREIGN PATENT DOCUMENTS

| CN | 101978285 A | 2/2011 |
| CN | 103117767 A | 5/2013 |

OTHER PUBLICATIONS

English Translation of the International Search Report dated May 28, 2014 for International Application No. PCT/CN2013/082599 filed Feb. 19, 2015.

(Continued)

*Primary Examiner* — Chuong P Nguyen
(74) *Attorney, Agent, or Firm* — Avery N. Goldstein; Blue Filament Law, PLLC

(57) ABSTRACT

The present invention relates to a radio frequency circuit structure for implementing a function of converting a satellite signal of a global navigation satellite system into a baseband signal. The radio frequency circuit structure comprises a channel dividing function module, a plurality of frequency converting function modules, a plurality of local oscillator signal modules, and a plurality of analog-to-digital convertor modules. The channel dividing function module is used for dividing a satellite signal of the global navigation (Continued)

satellite system received by an antenna into satellite signals in a plurality of channels. Each of the frequency converting function modules is used for performing frequency conversion on the satellite signals in the corresponding channels to form near zero-frequency signals. Each of the local oscillator signal module is used for generating a local oscillator signal and outputting the local oscillator signal to the frequency converting function module. By using the radio frequency circuit structure for implementing a function of converting a satellite signal of a global navigation satellite system into a baseband signal, frequency conversion and follow-up signal processing can be performed on the satellite signals in each frequency band separately, the signal quality insured, a sufficient signal to noise ratio is provided for a baseband processing circuit, thereby providing a wider application range.

12 Claims, 2 Drawing Sheets

(51) Int. Cl.
  *G01S 19/33* (2010.01)
  *G01S 19/35* (2010.01)
  *G01S 19/37* (2010.01)

(58) Field of Classification Search
  USPC ............ 342/357.72, 357.73, 357.75, 357.76, 342/357.77
  See application file for complete search history.

(56) References Cited

U.S. PATENT DOCUMENTS

| | | | | |
|---|---|---|---|---|
| 8,427,366 | B2* | 4/2013 | Ganeshan | G01S 19/33 342/357.46 |
| 8,604,974 | B2* | 12/2013 | Ganeshan | G01S 19/33 342/357.73 |
| 8,824,361 | B2* | 9/2014 | Rugamer | G01S 19/13 370/317 |
| 9,264,096 | B2* | 2/2016 | Arima | H04B 1/7097 |
| 9,482,760 | B2* | 11/2016 | Lennen | G01S 19/33 |
| 9,531,417 | B2* | 12/2016 | Tomiyama | H04S 1/1638 |
| 2009/0116586 | A1 | 5/2009 | Arambepola et al. | |
| 2009/0207075 | A1* | 8/2009 | Riley | G01S 19/32 342/357.31 |
| 2013/0021934 | A1* | 1/2013 | Rugamer | G01S 19/13 370/252 |
| 2013/0141280 | A1* | 6/2013 | Huang | G01S 19/235 342/357.76 |

OTHER PUBLICATIONS

Zhang, Lei et al. "_____", Popular Science & Technology, No. 2, Feb. 29, 2009, p. 13.

* cited by examiner

RADIO FREQUENCY CIRCUIT STRUCTURE FOR IMPLEMENTING FUNCTION OF CONVERTING GNSS SATELLITE SIGNAL INTO BASEBAND SIGNAL

FIELD OF TECHNOLOGY

This invention relates to the field of global navigation satellite systems (GNSS), more particularly to the field of radio frequency (RF) circuit in GNSS receiver, specifically refers to an RF circuit structure for implementing function of converting GNSS satellite signal into baseband signal.

DESCRIPTION OF RELATED ARTS

Beidou satellite navigation system (especially the second-generation Beidou satellite navigation system), GPS (Global Positioning System), GLONASS (GLONASS is the acronym of Global Navigation Satellite System in Russian) and Galileo (Galileo is the European satellite navigation System) are global satellite navigation and positioning systems respectively established by China, the United States, Russia and EU.

The current mainstream navigation method is that the navigation data are transmitted to the receiver for determining the satellite's position when transmitting signals and a ranging code allows the users' receiver to determine the transmission delay of the signal in order to determine the distance from the satellite to the users. Therefore. GNSS receiver is a critical users' equipment.

Currently applied GNSS receiver circuit generally comprises an antenna unit, an RF unit, a baseband digital signal processing unit and other components. The role of the RF unit is to filter out GNSS multi-mode multi-frequency satellite signals from the environment noises and to provide appropriate gain to meet the subsequent requirement of baseband digital signal processing unit. Theoretically the desired multi-mode multi-frequency GNSS satellite signals in the L band can be filtered out and then amplified for digital sampling, but this requires a more than 1 GHz of sampling frequency of audio-to-digital (A/D) convertor and high processing speed of baseband circuit, which is difficult to implement and extremely costly in the current technical conditions. Therefore, the usual approach is downconverting the multi-mode multi-frequency GNSS satellite signal by using the mixer, which greatly reduces the technical indicators requirement on A/D convertor circuit and baseband processing circuit.

The conventional designs is similar to usual superheterodyne radio structure, which is using a two level of frequency conversion to reduce the carrier frequency of the satellite signal by mixing and low-pass or band-pass sampling in the low intermediate frequency (IF). Since this design has a very complex circuit structure, when the processing up to eight bands of multi-mode multi-band GNSS satellite signal, a large number of local oscillation (LO) circuits and mixer circuits must be accompanied. This may cause great difficulties to debug the system and lead to a significant increase of cost, power consumption and size for the overall system, which can't meet the requirement of portable applications with GNSS receiver. There is also a zero-IF design of downconverting multi-mode multi-frequency GNSS satellite signal from 1.15~1.65 GHz of frequency channel directly to zero-frequency by one level of conversion. The circuit structure of this design is simpler than the former one, but there is the problem of direct current (DC) offset signal, which causes great difficulties to subsequent baseband processing. This invention of near zero-IF design provides a good solution to solve these problems.

SUMMARY OF THE INVENTION

The object of this invention is to overcome the disadvantages of the prior arts by providing RF circuit structure for implementing the function of converting GNSS satellite signal to baseband signal, which is with the advantage of reduced complexity, low crosstalk between the various satellite signals, ensured signal quality, sufficient signal-to-noise ratio (SNR) for baseband processing circuit and a wide applications area.

To achieve the above purpose, the RF circuit structure for implementing the function of converting GNSS satellite signal to baseband signal is with the structure that:

the RF circuit structure for implementing the function of converting GNSS satellite signal to baseband signal is characterized in that the circuit structure comprises:

a channel dividing module, for dividing GNSS satellite signal to a number of different channels of satellite signals according to the carrier frequency;

a plurality of frequency converting modules, each of which is corresponding to each channel output from the channel dividing module and each of which is used for converting each signal in corresponding output channel of the channel dividing module to near zero-frequency signal;

a plurality of LO signal modules, each of which is corresponding to each frequency converting signal module and each of which is used for generating LO signal and outputting it to corresponding frequency converting module;

a plurality of analog-to-digital convertor (ADC) modules, each of which is corresponding to the frequency converting module and each of which is used for processing the signal output from corresponding frequency converting module and outputting corresponding digital signal.

Preferably, each frequency converting module includes a band-pass filter and a mixer circuit; each signal in output channel of channel dividing module corresponding to frequency converting module is output to one of the input terminals of the mixer circuit via the band-pass filter; the other input terminal of the mixer circuit is connected to the output terminal of the LO module; the mixer circuit outputs the near zero-frequency signal to corresponding the ADC module.

More preferably, the frequency converting module further includes a single channel dividing circuit; the mixer circuit includes two mixers; the single channel dividing module divides output signal of band-pass filter into two co-channel signals; two co-channel signals are respectively output to two mixers; two mixers respectively output a first near zero-frequency signal and a second near zero-frequency signal to ADC modules.

Furthermore, the LO module includes LO signal circuit and phase-shift circuit; the LO signal circuit generates LO signals and outputs a first local oscillator signal and a second LO signal via phase-shift circuit.

Furthermore, the phase difference between the first LO signal and the second LO signal is 90°.

Furthermore, the single channel dividing circuit is a power divider.

Furthermore, the mixer is an image rejection mixer.

Furthermore, the image interference suppression of the image rejection mixer is greater than 20 dB.

Furthermore, each ADC module includes a low-pass filter, an automatic gain control (AGC) loop and an ADC circuit; the first near zero-frequency signal and the second near zero-frequency signal are converted into digital signal and output by ADC circuit via the low-pass filter, AGC loop and ADC circuit.

Furthermore, the AGC loop includes two variable gain amplifiers; the first near zero-frequency signal and the second near zero-frequency signal are respectively output to two variable gain amplifiers via the low-pass filler.

Furthermore, the ADC circuit consists of two A/D convertors each of which is corresponding to each of two variable gain amplifiers; the output signal of each variable gain amplifier is converted into a digital signal and output by corresponding A/D convertor.

Preferably, the channel dividing module divides GNSS satellite signal into GPS L1/L2/L5 signal, Beidou II B1/B2/B3 signal and GLONASS L1/L2 signal.

Preferably, the channel dividing module is a power divider.

For this invention, the RF circuit structure for implementing the function of converting GNSS satellite signal into a baseband signal has the following beneficial effects:

1. By using the near zero-IF design, only one level of frequency converting is needed for converting multi-mode multi-band GNSS satellite signal from 1.15~1.65 GHz frequency band directly to the vicinity of zero-frequency, which greatly reduces the complexity of the system, reduces the cost, power and volume of the system, and avoids the problem of DC offset in the zero-IF design.

2. By using the high-performance image rejection mixer, the mirrored interference suppression is greater than 20 dB, which ensures the signal quality. By using the high isolation mixers and power dividers, power level of LO leakage signal transferred to the antenna RF port is less than −102 dBm.

3. GNSS satellite signal in each frequency band is frequency converted and subsequently signal processed, which can reduce crosstalk between the various satellite signals, ensure signal quality and provide adequate SNR for the baseband processing circuit and be with a wider application areas.

DETAILED DESCRIPTION OF THE PREFERRED EMBODIMENT

In order to clearly illustrate the technical content of this invention, the embodiment below is for further describing.

Figure 1:
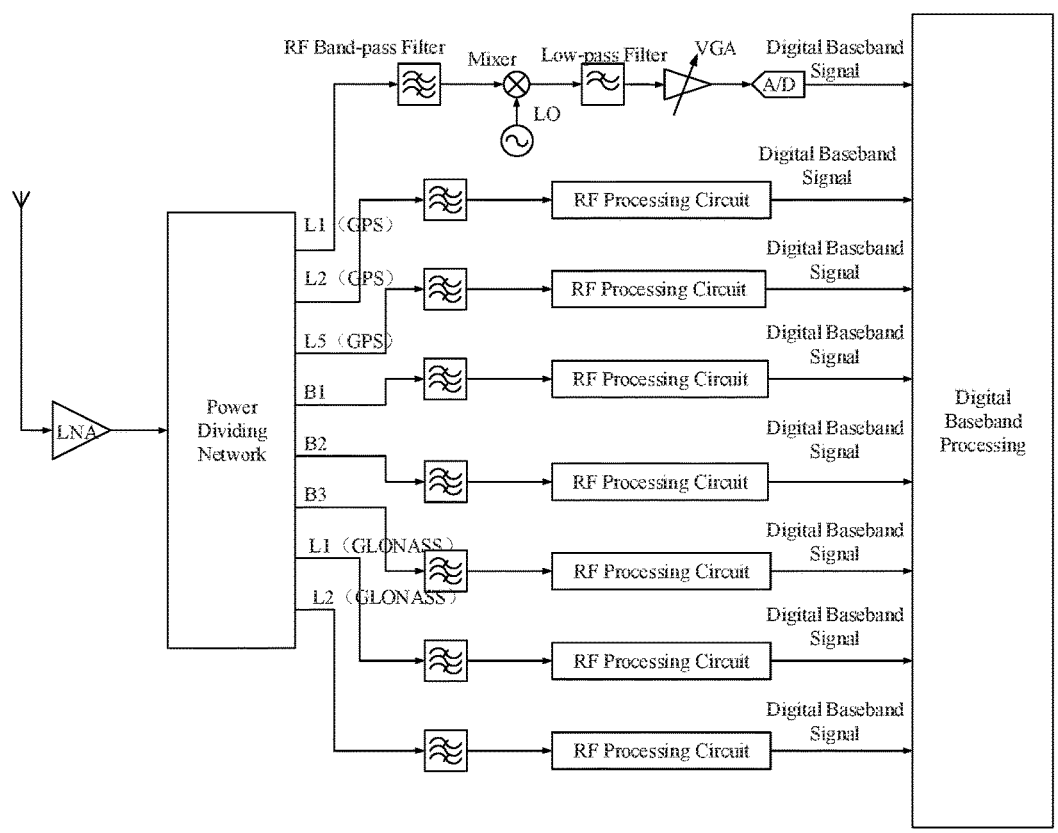
FIG. 1 is an overall block diagram of this invention, which is the RF circuit structure for implementing the function of converting GNSS satellite signal into baseband signal.

FIG. 1 is an overall block diagram of this invention, which is the RF circuit structure for implementing the function of converting GNSS satellite signal into baseband signal.

The circuit structure for implementing the function of converting GNSS satellite signal into baseband signal comprises:

(1) a channel dividing module, for dividing GNSS satellite signals into a number of different channels of satellite signals according to the carrier frequency;

wherein the channel dividing module divides GNSS satellite signal into GPS L1/L2/L5 signal, Beidou II B1/B2/B3 signal and GLONASS L1/L2 signal.

(2) a plurality of frequency converting modules, each of which is corresponding to each channel output from the channel dividing module and each of which is used for converting each signal in corresponding output channel of the channel dividing module to near zero-frequency signal;

wherein each frequency converting module includes a band-pass filter and a mixer circuit; each signal in output channel of channel dividing module corresponding to frequency converting module is output to one of the input terminals of the mixer circuit via the band-pass filter; the other input terminal of the mixer circuit is connected to the output terminal of the LO module; the mixer circuit outputs the near zero-frequency signal to corresponding the ADC module.

furthermore, the frequency converting module further includes a single channel dividing circuit; the mixer circuit includes two mixers; the single channel dividing module divides output signal of band-pass filter into two co-channel signals; two co-channel signals are respectively output to two mixers; two mixers respectively output a first near zero-frequency signal and a second near zero-frequency signal to ADC modules; wherein the single channel dividing circuit is a power divider; the mixer is an image rejection mixer; the image interference suppression of the image rejection mixer is greater than 20 dB.

(3) a plurality of LO signal modules, each of which is corresponding to each frequency converting signal module and each of which is used for generating LO signals and outputting them to corresponding frequency converting module;

wherein the LO module includes LO signal circuit and phase-shift circuit; the LO signal circuit generates LO signals and outputs a first local oscillator signal and a second LO signal via phase-shift circuit; the phase difference between the first LO signal and the second LO signal is 90°.

(4) a plurality of ADC modules, each of which is corresponding to the frequency converting module and each of which is used for processing the signal output from corresponding frequency converting module and outputting corresponding digital signal;

wherein each ADC module includes a low-pass filter, an AGC loop and an ADC circuit; the first near zero-frequency signal and the second near zero-frequency signal are converted into digital signal and output by ADC circuit via the low-pass filter, AGC loop and ADC circuit.

furthermore, the AGC loop includes two variable gain amplifiers; the first near zero-frequency signal and the second near zero-frequency signal are respectively output to two variable gain amplifiers via the low-pass filter; the ADC circuit consists of two A/D convertors each of which is corresponding to each of two variable gain amplifiers; the output signal of each variable gain amplifier is converted into a digital signal and output by corresponding A/D convertor.

The circuit structure implements the process of converting GNSS multi-mode multi-frequency satellite signal into baseband signal, including the process of dividing GNSS multi-mode multi-frequency satellite signal into eight channels signal of GPS L1/L2/L5 signal, Beidou II B1/B2/B3 signal and GLONASS L1/L2 signal, including the process of converting GNSS multi-mode multi-frequency satellite signal into near zero-frequency signal; and including the process of obtaining I channel and Q channel digital signal from near zero-frequency signal via filtering, amplifying and A/D converting process.

Figure 2:
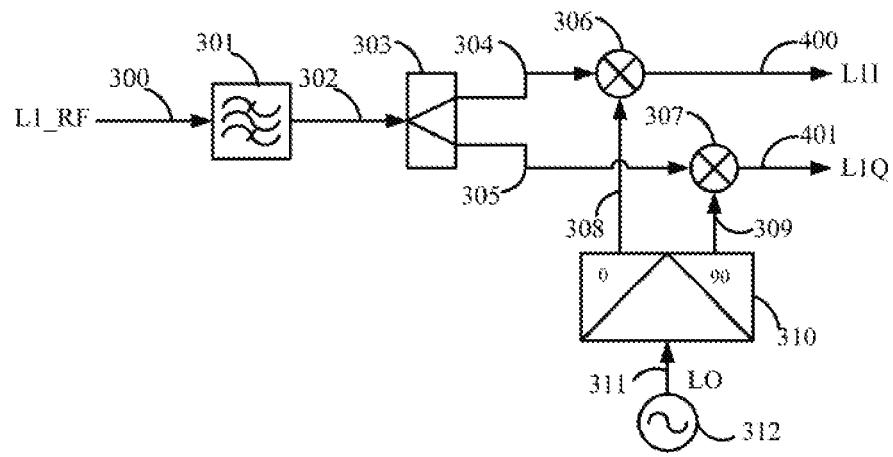
FIG. 2 is a circuit block diagram of frequency converting module and LO signal module of this invention.

FIG. 2 is a circuit block diagram of frequency converting module and LO signal module of this invention.

The frequency converting module and the LO signal module implement the process of downconverting GNSS the satellite signal in each frequency band into two orthogonal near zero-frequency signals. The process of downconverting GNSS the satellite signal in each frequency band is similar. The process of downconverting in L1 frequency band is described for example. In L1 frequency band, signal 300 is filtered by band-pass filter 301 with 20 MHz of 1 dB bandwidth. The obtained signal 302 is divided into two signals 304 and 305 with the same band and phase by the power divider 303. Signal 304 and LO I channel signal 308 is downconverted by the mixer 306 for generating I signal 400 of L1; Signal 305 and LO Q channel signal 309 is downconverted by the mixer 307 for generating Q signal 401 of L1. Wherein, LO I channel signal 308 and Q channel signal 309 are obtained from LO signal 311 generated by the LO circuit 312 via the phase-shift network 310; the phase of LO I channel signal 308 is 90° advanced than the phase of LO Q channel signal 309.

Figure 3:
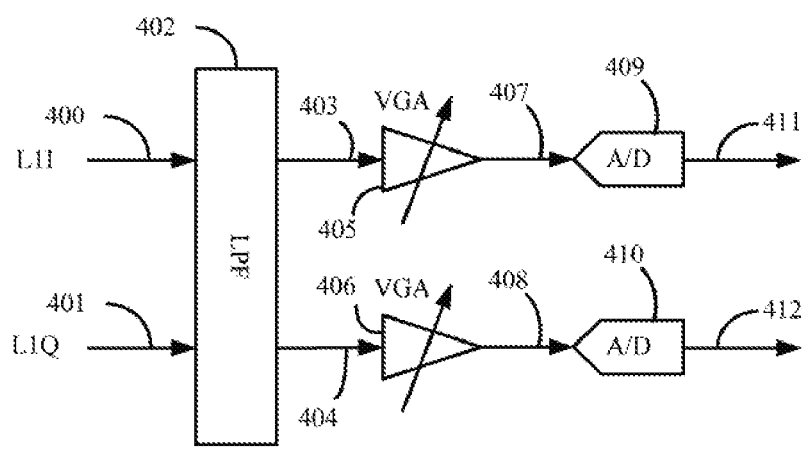
FIG. 3 is a circuit block diagram of ADC module of this invention.

FIG. 3 is a circuit block diagram of ADC module of this invention.

The ADC module implements the processing of obtaining I and Q channel digital signals from two orthogonal near zero-frequency signals via filtering, amplifying, A/D converting process Since the GNSS satellite signal processing flow in each frequency band is similar, the processing flow in L1 frequency band is described for example. Signal 403 is obtained from I channel signal 400 of L1 via low-pass filter 402 with 9 MHz of 1 dB bandwidth. The signal 407 is obtained from the obtained signal 403 via the VGA 405. The digital signal 411 is obtained from the obtained signal 407 via the A/D convertor 409. Signal 404 is obtained from Q channel signal 401 via the low-pass filter 402 with 9 MHz of 1 dB bandwidth. Signal 408 is obtained from the obtained signal 404 via the VGA 406. The digital signal 412 is obtained from the obtained signal 408 via the A/D convertor 410. The digital signals 411 and 412 will be transmitted to baseband processing circuit for further processing.

For this invention, the RF circuit structure for implementing the function of converting GNSS satellite signal into a baseband signal has the following beneficial effects:

1. By using the near zero-IF design, only one level of frequency converting is needed for converting multi-mode multi-band GNSS satellite signal from 1.15~1.65 GHz frequency band directly to the vicinity of zero-frequency, which greatly reduces the complexity of the system, reduces the cost, power and volume of the system, and avoids the problem of DC offset in the zero-IF design.

2. By using the high-performance image rejection mixer, the mirrored interference suppression is greater than 20 dB, which ensures the signal quality. By using the high isolation mixers and power dividers, power level of LO leakage signal transferred to the antenna RF port is less than −102 dBm.

3. GNSS satellite signal in each frequency band is frequency converted and subsequently signal processed, which can reduce crosstalk between the various satellite signals, ensure signal quality and provide adequate SNR for the baseband processing circuit and be with a wider application areas.

This invention has been described with reference to certain embodiments. However, various changes may be made and equivalents may be substituted without departing from the scope of the present invention. Therefore, this invention is not limited to the particular embodiment disclosed, but that this invention includes all embodiments falling within the scope of the appended claims.

We claim:

1. A radio frequency circuit structure configured to convert a GNSS satellite signal into a baseband signal, the circuit structure comprising:
    a channel dividing module, configured to divide the GNSS satellite signal to a number of different channels of satellite signals according to a set of different carrier frequencies;
    a plurality of frequency converting modules, where each of the frequency converting modules corresponds to each channel output from the channel dividing module and where each of the frequency converting modules is used for converting each GNSS satellite signal in a corresponding output channel of the channel dividing module to a near zero-frequency signal;
    a plurality of local oscillator signal modules, where each local oscillator signal module corresponds to each frequency converting signal module and each of the local oscillator signal modules is configured to generate local oscillator signals and outputting the local oscillator signals to the corresponding frequency converting module;
    a plurality of analog-to-digital convertor modules, each of the analog-to-digital convertor modules corresponds to one of the frequency converting modules and each of the analog-to-digital convertor modules is configured to process the signal output from the corresponding frequency converting module and outputting a corresponding digital signal;
    wherein each of the plurality of frequency converting modules further comprises a band-pass filter and a mixer circuit, where each of the different channels of satellite signals in an output channel of each of the channel dividing modules corresponds to one of the plurality of frequency converting modules and is outputted to one of a set of input terminals of the mixer circuit via the band-pass filter, and where a second input terminal of the mixer circuit is connected to a corresponding output terminal of one of the plurality of local oscillator modules, where the mixer circuit outputs the near zero-frequency signal to one of the plurality of corresponding analog-to-digital convertor modules; and
    wherein each of the plurality of frequency converting modules further comprises a single channel dividing circuit, where the mixer circuit further comprises two mixers, where the single channel dividing circuit divides an output signal of the band-pass filter into two co-channel signals, where the two co-channel signals are respectively output to the two mixers, and the two mixers respectively output a first near zero-frequency signal and a second near zero-frequency signal to the analog-to-digital convertor modules.

2. The radio frequency circuit structure according to claim 1, wherein the local oscillator module further comprises a local oscillator signal circuit and a phase-shift circuit where the local oscillator signal circuit generates local oscillator signals and outputs a first local oscillator signal and a second local oscillator signal via the phase-shift circuit.

3. The radio frequency circuit structure according to claim 2, wherein a phase difference between the first local oscillator signal and the second local oscillator signal is 90°.

4. The radio frequency circuit structure according to claim 1, wherein the single channel dividing circuit is a power divider.

5. The radio frequency circuit according to claim 1, wherein the mixer circuit is an image rejection mixer.

6. The radio frequency circuit structure according to claim 5, wherein a level of image interference suppression of the image rejection mixer is greater than 20 dB.

7. The radio frequency circuit structure according to claim 1, wherein each of the plurality analog-to-digital convertor modules further comprises a low-pass filter, an automatic gain control loop, and an analog-to-digital convertor circuit, where the first near zero-frequency signal and the second near zero-frequency signal are converted into digital signals and output by the analog-to-digital convertor circuit via the low-pass filter, automatic gain control loop, and the analog-to-digital convertor circuit.

8. The radio frequency circuit structure according to claim 7, wherein the automatic gain control loop further comprises two variable gain amplifiers, where the first near zero-frequency signal and the second near zero-frequency signal are respectively output to the two variable gain amplifiers via the low-pass filter.

9. The radio frequency circuit structure according to claim 8, wherein the analog-to-digital (A/D) convertor circuit consists of two A/D convertors each of which corresponds to each of the two variable gain amplifiers, where the output signal of each variable gain amplifier is converted into a digital signal and output by the corresponding A/D convertor.

10. The radio frequency circuit structure according to claim 1, wherein the channel dividing module divides GNSS satellite signal into GPS L1/L2/L5 signal, Beidou II B1/B2/B3 signal and GLONASS L1/L2 signal and other GNSS satellite signals in the frequency band coinciding with GNSS satellite signals mentioned above.

11. The radio frequency circuit structure according to claim 1, wherein the channel dividing module is a power divider.

12. The radio frequency circuit structure according to claim 1, wherein eight channels of multi-mode multi-frequency GNSS satellite signals in 1.15~1.65 GHz frequency band are comprised in the GNSS satellite signal, and the circuit structure converts the said eight channels of multi-mode multi-frequency GNSS satellite signals into the digital baseband signals at the same time.

* * * * *